J. B. ST. LOUIS.
AXLE ATTACHMENT FOR VEHICLES.
APPLICATION FILED NOV. 29, 1915.
1,199,833.
Patented Oct. 3, 1916.
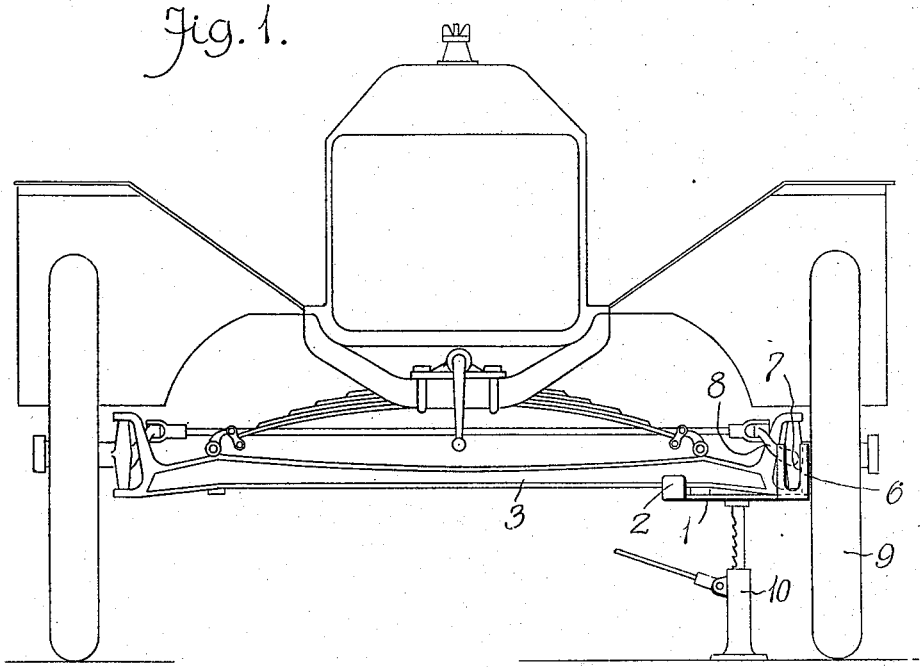
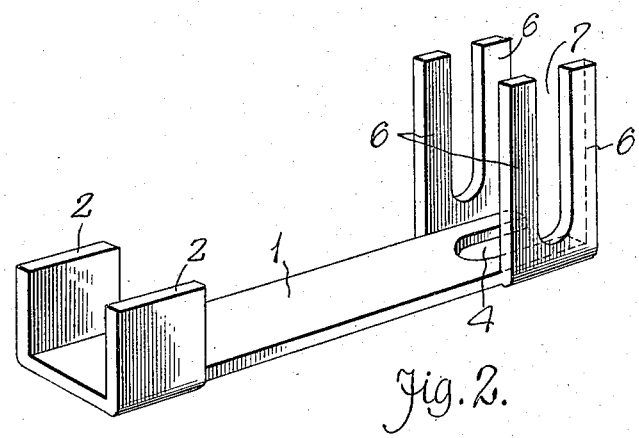
Witnesses
Chas. W. Stauffiger
Karl H. Butler
Inventor
Joseph Byron St. Louis.
By
Attorneys

UNITED STATES PATENT OFFICE.

JOSEPH BYRON ST. LOUIS, OF WINDSOR, ONTARIO, CANADA.

AXLE ATTACHMENT FOR VEHICLES.

1,199,833.          Specification of Letters Patent.        Patented Oct. 3, 1916.

Application filed November 29, 1915. Serial No. 64,001.

*To all whom it may concern:*

Be it known that I, JOSEPH BYRON ST. LOUIS, a subject of the King of England, residing at Windsor, in the county of Essex and Province of Ontario, Canada, have invented certain new and useful Improvements in Axle Attachments for Vehicles, of which the following is a specification, reference being had therein to the accompanying drawings.

My invention relates to improvements in axle attachments and more particularly in an attachment adapted to be used when jacking up or raising an axle of an automobile, the attachment being primarily designed to prevent the steering wheels of an automobile from swinging to either side or in a lateral plane while the wheels are elevated, thus holding the wheels whereby operations can be expeditiously performed upon the same or any part thereof.

The attachment is in the form of a simple, durable and inexpensive device that can be easily and quickly placed under an axle to hold a steering knuckle thereof stationary while the axle is in an elevated position, and the device can be advantageously used in connection with round axles to prevent a jack or other elevating device from slipping from beneath such axle as the same is elevated.

I attain the above and other objects by a mechanical construction illustrated in the accompanying drawing, in which—

Figure 1 is a front elevation of a portion of an automobile, illustrating the axle attachment in position, and Fig. 2 is a perspective view of the axle attachment.

In the two views, the reference numeral 1 denotes a flat oblong plate having the inner end thereof provided with oppositely disposed upstanding parallel ears 2 adapted to engage the side walls of an axle 3, when the plate 1 is placed beneath the axle, as best shown in Fig. 1. The opposite end of the plate 1 is slotted, as at 4, to provide clearance for the fork of the axle or a portion of a knuckle 5 supported by the fork of the axle. This same end of the plate has upstanding parallel arms 6 bifurcated or slotted, as at 7, to engage a crank or arm 8 of the knuckle 5, and thereby hold the knuckle and the steering mechanism to prevent steering wheels 9 from swinging to one side or the other. In so holding the wheels operations can be performed more readily upon the wheel, besides the plate 1 affords a better purchase for a jack 10 or a raising device employed for elevating an end of the axle.

By providing two of the arms 6, the attachment can be used at either end of the axle 3, and the construction and shape of the attachment permits of its being readily carried as part of an automobile kit. It is possible to cut and stamp the device from strong and durable metal and then bend the ears and arms into angular relation to the plate or body of the device. When so manufactured it can be produced at a comparatively small cost and advantageously used in repair garages.

What I claim is:—

1. As a new article of manufacture, a member adapted to be placed between an automobile axle and a raising device and retained in engagement with the axle by the raising device, and means on an end of said member adapted to engage a portion of said knuckle to maintain the spindle of the knuckle of the axle in alinement therewith.

2. The combination with an automobile axle having knuckles, a steering mechanism for moving said knuckles and means for elevating said axle, of a plate adapted to be placed in engagement with said axle to hold said steering mechanism stationary relative to said axle during an elevation thereof.

3. The combination with an automobile axle having knuckles, a steering mechanism for moving said knuckles, and means for elevating said axle, of a plate adapted to be placed between said axle and said elevating means, and means carried by said plate to engage a knuckle and hold said steering mechanism stationary relative to said axle.

4. An automobile axle attachment comprising a plate, ears on said plate adapted to engage sides of an axle, and slotted arms carried by said plate adapted to engage a knuckle of said axle.

In testimony whereof I affix my signature in presence of two witnesses.

JOSEPH BYRON ST. LOUIS.

Witnesses:
  KARL H. BUTLER,
  G. E. McGRANN.